United States Patent [19]

Crossland et al.

[11] 3,812,462

[45] May 21, 1974

[54] REMOTE MONITORING AND REMOTE CONTROL SYSTEMS

[75] Inventors: Edward J. Crossland; James H. Blossom; Lester Q. Krasin, all of Tulsa, Okla.

[73] Assignee: Seismograph Service Corporation, Tulsa, Okla.

[22] Filed: Nov. 17, 1972

[21] Appl. No.: 307,494

[52] U.S. Cl. .............................. 340/163, 340/168 S

[51] Int. Cl. .............................................. H04q 9/00

[58] Field of Search ........ 340/163, 150, 151, 168 S; 178/66 R; 343/178

[56] References Cited

UNITED STATES PATENTS

| | | | |
|---|---|---|---|
| 3,200,380 | 8/1965 | MacDonald et al. | 340/150 X |
| 3,336,577 | 8/1967 | Frielinghaus | 340/163 |
| 3,541,513 | 11/1970 | Paterson | 340/151 |
| 3,665,103 | 5/1972 | Watkins | 178/66 R |
| 3,680,050 | 7/1972 | Griffin | 340/168 S |
| 3,697,952 | 10/1972 | Hayre | 340/163 |

*Primary Examiner*—Donald J. Yusko

*Attorney, Agent, or Firm*—Mason, Kolehmainen, Rathburn & Wyss

[57] ABSTRACT

Four basic modules serve as flexible building blocks for the construction of remote monitoring and remote control systems of any desired degree of simplicity or complexity. Remotely located addressable transceiver modules may each initiate up to four control actions and may monitor up to 12 Boolean variables or their equivalent. A multiplexer module enables a single transceiver module to initiate up to 16 control actions and to monitor up to 48 Boolean variables or their equivalent. An accumulator module enables a transceiver module to count the occurrences of up to 12 different events. An analog-to-digital converter module enables a transceiver module to monitor up to 10 analog signals. Remotely located module arrays are assembled and are connected to a centrally located transceiver by any suitable two-way, voice-grade communications system. The monitoring and control system is then operated by having the centrally located transceiver address commands to and receive data back from individual remotely located module arrays. A system may include anywhere from one to over 4,000 remotely located arrays of one to four modules each. The remotely located arrays draw very little current and may typically be powered by conventional batteries for more than a year without maintenance.

7 Claims, 11 Drawing Figures

REMOTE MONITORING AND REMOTE CONTROL SYSTEMS

BACKGROUND OF THE INVENTION

1. Field of the Invention

The present invention relates to systems for monitoring and/or controlling operations taking place at a plurality of remote sites from a central location.

2. Brief Description of the Prior Art

Many varieties of systems are known which permit remotely located apparatus to be monitored and controlled from a central location. In the production of oil and of natural gas, such systems are often used to monitor and to control the operation of well head controls.

In the past, such systems have been expensive and difficult to install. Typically, cables would have to be laid between the various portions of the system so as to interconnect the various remote sites with the central location. Such a system is costly to install, and typically the cable is not worth salvaging after the monitoring system has served its usefulness. As a result, it has been economically impracticable to utilize such a system for monitoring in a location where the system would not be in use for more than a year or two at a time.

An additional disadvantage of prior art arrangements is their use of an expensive data terminal at each remote site. While some remote sites may require enough monitoring and control functions to justify the use of an expensive terminal, other sites may require only a few simple monitoring and control functions and could therefore be adequately served by an extremely simple terminal. In prior art systems, such limited service sites could typically be serviced by cables running from another site having a full terminal, although the placement of such cables is expensive. Alternatively, different forms of terminal equipment may be used at different sites depending upon the requirements of each site. However, then a servicing problem arises in that maintenance personnel are required to carry with them a much larger stock of replacement parts than would be the case if all the terminals were identically constructed.

Prior systems utilize cable or wide band radio channels for the transmission of data between remote sites and a central location. The Federal Communications Commission has now made available a number of extremely narrow bandwidth U.H.F. channels having a bandwidth of only 2,800 cycles per second. These channels would be suitable and convenient for use in monitoring and control systems, but conventional systems typically generate wide band signals which are not suitable for transmission over such a narrow bandwidth channel.

SUMMARY OF THE INVENTION

A primary object of the present invention is to overcome the various shortcomings of the prior art arrangement which have just been briefly described. To summarize briefly, it is an object of the invention to obtain a monitoring and control system which may be quickly and easily established, which may be easily serviced, and which may be salvaged and reused almost in its entirety after the need for a particular monitoring or control operation terminates. Another object is to design a system which permits fairly elaborate monitoring and control systems to be constructed from modular components at some remote sites and which also permits extremely simple systems to be constructed from the same modular components at other sites. It is also an object of the invention to minimize servicing problems by maximizing interchangeability of system components. Another object of the invention is to design a system which may carry out two way communications ov;er narrow band radio transmission channels.

Briefly summarized, the present invention contemplates providing a limited number of modules or basic building blocks which may be used to form a monitoring and control system of any desired simplicity or complexity. At its simplest, the present invention contemplates having at each remote site a single transceiver module which is able to initiate up to four control actions at the site and which is able to monitor up to twelve Boolean variables or signals at the site. By adding additional modules to some of the basic transceiver modules and by providing more than one basic transceiver module at some sites, any desired number of control actions may be initiated at each site, and any number of analog, digital, and event-occurrence variables may be monitored at each site.

In the preferred embodiment of the invention, four basic module building blocks are provided—a transceiver module, an analog-to-digital converter module, an accumulator module, and a multiplexer module. Various combinations of the four basic modules are typically interconnected using a wire-wrap panel or other flexible interconnecting arrangement to provide any desired monitoring and/or control configuration at each remote site. The basic modules themselves are not altered, and after a system has outlived its usefulness, all of the system modules may be easily recovered and used in the construction or repair of other systems. The use of only four basic modules greatly simplifies system maintenance, since the repair technician needs only to carry with him several modules of each type, and he is prepared to cope with any problem which may arise.

The basic transceiver module includes a data receiver and transmitter. It also includes address decoding logic for determining whether a particular transmission is addressed to itself or to some other transceiver module elsewhere within a single system. In the preferred embodiment of the invention, a monitoring or control action is initiated when a centrally located transmitter transmits a 20-bit message to an array of transceiver modules all of which are connected to the transmitter by a single communications channel—either a cable or a U.H.F. radio linkage. The first 12 bits of the message comprise the address of the transceiver to which the message is directed. The next four bits of the message comprise a command to equipment located at the remote site. The last four bits of the message are framing bits which are used for error detection and to insure that the message has been properly received.

When a transceiver recognizes that a message contains the transceiver's address, then the transceiver retrieves the four command bits from the transmission and uses the four command bits to initiate some form of control action—typically actuating one or more of four possible devices. After the expiration of a time delay, the transceiver accepts twelve bits of data from monitoring or other devices at the remote location and returns these data bits to the central location as part of a return 20-bit message which includes in addition leading and lagging four-bit sets of framing bits.

The simplest basic remote system configuration consists of a single transceiver module of the type just described interfaced with apparatus at the remote site. The four command bits are typically used individually to actuate four independent relays or their equivalent at the remote location and to cause appropriate control actions to take place. For example, a bit may start or stop a motor or initiate a measurement or task. The status of the events occurring at a remote location is typically indicated by the state of twelve sets of electrical contacts associated with relays or other equipment at the remote site. For example, a temperature sensing transducer may open or close one pair of contacts to indicate whether the temperature of a system component is within or beyond its normal range. Similarly, pressure sensing transducers and voltage and current measuring transducers may be arranged to open and close contacts so as to indicate the normality or abnormality of conditions at a given remote site. From the states of these twelve sets of contacts or their equivalent, the transducer extracts the twelve data bits which are returned to the central location as part of each return message.

If no more than four Boolean commands are to be transmitted to a remote location and if no more than twelve Boolean data bits are to be returned from a remote location, then a single transceiver module is sufficient to meet the requirements of the remote location. Some of the remote sites typically require that the magnitude of analog signals be measured and transmitted back to a central location. At these remote sites, an analog-to-digital converter module is combined with a basic transceiver module. In the preferred embodiment of the invention, the analog-to-digital converter module includes ten analog inputs which are switched-selected under the control of the four command signals which are supplied by the transceiver module. In response to any particular combination of high and low command signals, the analog-to-digital converter module selects one particular analog signal, generates a 12-bit number representing the magnitude of the signal, and supplies the 12-bit number to the transceiver module so that the number may be returned to the central location.

Other remote locations may require that a count be maintained of recurring events. For example, a remotely located fluid flow meter may generate a pulse each time a certain quantity of fluid flows through the meter, and the pulse count has to be maintaied as a record of the total flow. At such remote sites, an accumulator module may be combined with the basic module. The accumulator module includes a plurality of counters each of which may be arranged to count electrical pulses supplied when a particular event occurs. In response to different combinations of the four control signals supplied by the transceiver module, the accumulator module presents the total count of one or more of the counters to the transceiver module in the form of a 12-bit binary number for transmission back to the central location.

If more than four command signals are required at a particular remote site or if more than 12 monitor data bits are to be returned from the site, then a multiplexer module may be added to the basic transceiver module so as to expand by four-fold or more its controlling and data gathering capability. The multiplexer module decodes the four command bits supplied by the transceiver module into one of 16 unique command signals and thus allows any one of 16 different functions to be initiated at the remote site. The multiplexer module in the preferred embodiment of the invention also includes gates which allow a number of sets of twelve input signals to be selected and connected to the 12 bit data input of the transceiver module in response to combinations of command bits. Thus, any desired group of twelve data bits may be returned to a central location in response to an appropriate command from the central location.

By using various combinations of the four basic modules, almost any desired monitoring and control configuration may be easily achieved and tailored to the particular needs of each remote location. Typically, one transceiver module is used in connection with none, one, or two of the other modules to give a particular data gathering capability, and if increased capacity is desired, then an additional transceiver module is added along with an associated set of the other modules. The cost of the resulting remote terminals is kept low by the elimination of the need for custom logic designs other than a slight variation in the wire wrapping used at each remote location.

The transceiver modules are designed to respond to a tone code modulation in which four tones whose frequencies are closely spaced serve to carry binary-coded-decimal data between the central location and the remotely located transceivers. Through the use of tone modulation, closely spaced tones, and a slow data transmission rate, the transceivers are able to utilize extremely narrow bandwidth radio communication channels which might not be suitable for the operation of conventional data gathering systems. Each transceiver module includes provision for rejecting any signal which may be erroneous or which is ambiguous so as to prevent a response to an erroneous signal.

The monitoring and control system is designed for use in conjunction with a centrally located control system. A transceiver module similar or identical to those located at the remote sites may be used at the central location to interrogate the remotely located transceivers and to receive back communications from the remotely located transceivers. The centrally located transceiver module may interface directly with supervisory personnel, or it may interface with a minicomputer or other equivalent automatic control device so that the entire system operates automatically and without human intervention.

Further objects and advantages of the invention are apparent in the detailed description which follows, and the points of novelty which characterize the invention are pointed out with particularity in the claims annexed to and forming a part of the specification.

BRIEF DESCRIPTION OF THE DRAWINGS

For a better understanding of the invention, reference will be made to the drawings wherein.

DESCRIPTION OF THE PREFERRED EMBODIMENT

Figure 1:
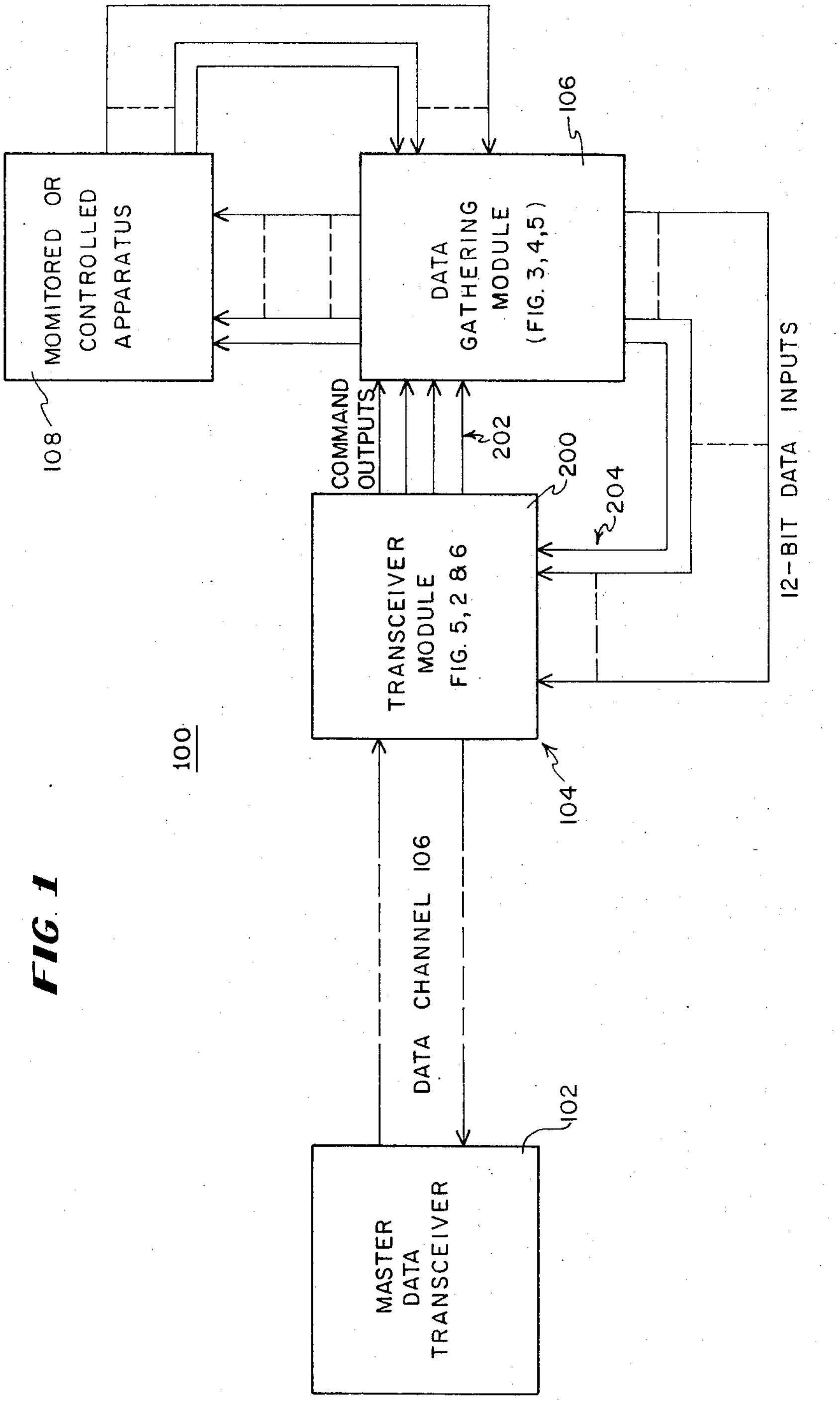
FIG. 1 is an overview block diagram of a monitoring and control system designed in accordance with the present invention.

Referring now to FIG. 1, there is shown an overview block diagram of a remote monitoring and remote control system 100 which is designed in accordance with the present invention. The system 100 includes a master data transceiver 102 and a plurality of remote units similar to the typical remote unit 104 which are interconnected to the data transceiver 102 by a two-way voice-grade data channel 106. Each of the remote units 104 includes at least one transceiver module 200. Each transceiver module 200 interfaces with monitored and/or controlled apparatus 108 located at the remote location either directly or indirectly through one or more data gathering modules 106. The data gathering modules 106 may be analog-to-digital converter modules of the type shown in FIG. 4, accumulator modules of the type shown in FIG. 3, or multiplexer modules of the type shown in FIG. 5.

A monitoring or control function is initiated when the master data transceiver 102 generates a message signal that is addressed to one of the transceiver modules 104 and that contains a 4-bit number which may be called a "command" or "command word." The addressed transceiver module accepts the message signal, extracts the 4-bit command word from the message signal, and presents the 4-bit command word on four signal lines which are called the command outputs 202. After a brief delay, the transceiver 104 accepts 12 bits of data from 12 signal lines which are referred to as the 12-bit data inputs 204. The transceiver 104 then transmits back to the master data transceiver 102 a message which contains the 12 bits of data.

At its simplest, the present invention contemplates using the four transceiver command outputs 202 to initiate up to four different operations of the monitored or controlled apparatus 108. For example, a first control output may be used to start a motor, and a second control output may be used to stop the same motor. A third control output may cause a test procedure to be carried out—for example, testing an alarm device to insure that the device is fully operational.

Again at its simplest, the present invention envisions that up to twelve switches, relay contacts, and the like associated with the monitored or controlled apparatus 108 may be connected directly to the data inputs 204. For example, a first input 204 may connect to contacts which are actuated by a rotation sensor that is physically connected to a motor, and thus the signal at this input 204 indicates whether the motor is operating or not. A second input 204 may connect to contacts which are actuated by a relay that is controlled by a temperature sensing element mounted within a motor, and thus the signal at this input indicates whether the motor is too hot or cold.

Using just a single simple transceiver module at a remote site, the present invention is able to initiate up to four control actions and to gather data on 12 different Boolean variables. At sites where more control functions or more complex monitoring functions are required, one or more data gathering modules 106 may be connected between the basic transceiver module 104 and the monitored or controlled apparatus 108. A multiplexer module, shown in FIG. 5, allows a single transceiver to initiate up to 16 independent control actions. The multiplexer module also includes provision whereby any four of the 16 independent control actions may be dedicated to initiating the retrieval of up to 48 Boolean variables from the environment of the monitored or controlled apparatus 108.

An alalog-to-digital converter module (FIG. 3) enables a transceiver to monitor the amplitudes of up to ten analog signals associated with the monitored or controlled apparatus 108. In response to ten different combinations of the command outputs 202, the converter module selects one of ten possible analog input signals, digitizes the magnitude of the analog input signal, and presents a 12-bit number representing the amplitude of the analog input signal to the 12-bit data inputs of the transceiver module 104.

An accumulator module (FIG. 4) enables a record to be maintained of how many times one or more events have occurred. The accumulator module contains ten independent counters each of which may be used to count the number of times some event occurs. When interconnected with a basic transceiver module, an accumulator module interprets five different combinations of command outputs from the transceiver as five commands. In response to each such command, the accumulator module transfers the numeric contents of two of its counters to the transceiver data inputs 204. The master data transceiver is thus enabled to obtain the total count from any two of the ten counters at any time.

The data gathering modules may also be used in pairs with a single transceiver. For example, an analog-to-digital converter module and an accumulator module may share a single transceiver. As another example, a multiplexer module may share a transceiver with either of the above modules or with a second multiplexer module.

If more control capability or data gathering capability is required at a remote location than can be provided by a single transceiver in combination with several data gathering modules, then more than one transceiver module may be installed at the remote location. A single system may include over 4,000 transceivers all connected to a common data channel 106. Hence, the complexity of the monitoring and control hardward which is located at any one site may be custom-tailored to meet the particular requirements of the location. Additional monitoring and control capacity may be easily added to or deleted from any site by simply adding additional transceiver modules or removing transceiver modules and other modules which are no longer required.

Figure 2:
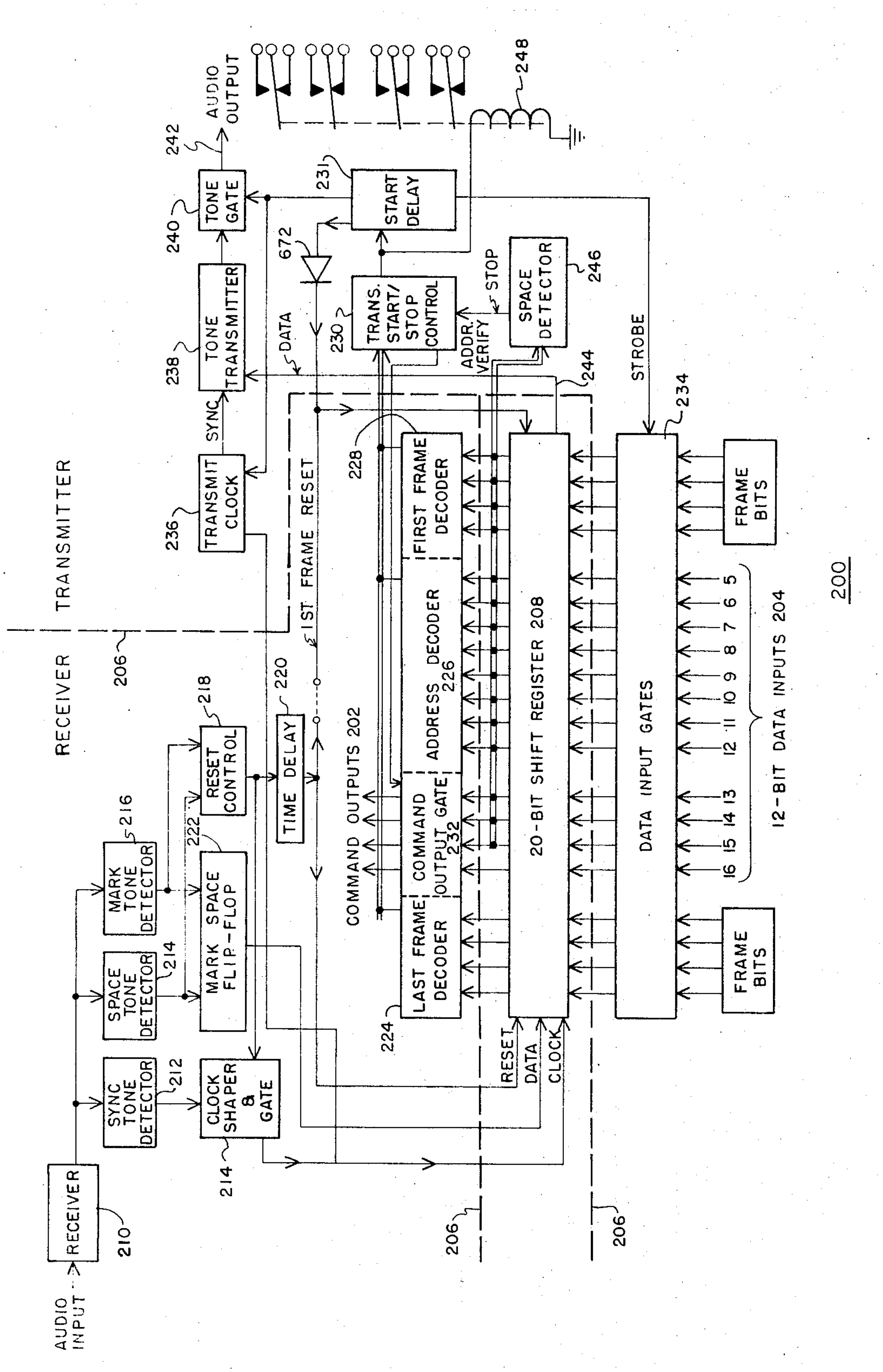
FIG. 2 is a block diagram of a transceiver module designed in accordance with the present invention.

FIG. 2 is a block diagram of a suitable transceiver module 200. A detailed circuit diagram of the transceiver module 200 is presented in FIGS. 6A, 6B, 6C, and 6D and is described in detail towards the end of this specification. In FIG. 2, a broken line 206 divides the transceiver roughly into two sections, one of which is labeled the receiver section and the other of which is labeled the transmitter section. A 20-bit shift register 208 is common to both sections and is used both for the storage of a message which has just been received and also for the storage of a message which is about to be transmitted.

For a full understanding of the transceiver 200, it is necessary first to understand the type of code modulation which the transceiver 200 is designed to receive and to transmit. In brief, the transceiver is designed to receive and to transmit a tone code modulation in which a mark or "1" data bit is represented by a 900 Hz. tone and in which a space of "0" data bit is represented by an 800 Hz. tone. Synchronization between a transmitter and a receiver is achieved by transmitting a 1,000 Hz. synchronizing tone between successive information tone transmissions. A normal transmission begins with a synchronizing 1,000 Hz. tone burst and then continues with a series of 800 and 900 cycle mark and space tone burst which are separated from one another by 1,000 Hz. synchronizing tone bursts.

Referring to FIG. 2, the receiver portion of the transceiver 200 is shown primarily to the left of the line 206 and includes the 20-bit shift resistor 208. An audio tone signal input is applied to a receiver 210. The audio tone signal input may arrive at the receiver 210 via telephone, telegraph, or by other direct communication line system, or it may come over a radio linkage of some form. The receiver 210 is basically a combination high gain amplifier and limiter which may accept an audio input signal whose amplitude may vary by as much as 50 decibels.

The limited output of the receiver 210 is supplied to three tone detectors, 212, 214, and 216. A sync tone detector 212 examines the signal output of the receiver 210 for the presence of a 1,000 Hz. synchronizing tone. A space tone detector 214 examines the signal output of the receiver 210 for the presence of an 800 Hz. "space" tone. A mark tone detector 216 examines the signal output of the receiver 210 for the presence of a 900 Hz. "mark" tone. Each of the detectors 212, 214, and 216 is designed to respond to a tone signal supplied by the receiver 210 only if the amplitude of the tone signal is at least 6 decibels greater than the total energy content of the output signal which is supplied by the receiver 210. The detectors 212, 214, and 216 thus reject an overly noisy signal or a signal which contains more than two tones which are transmitted simultaneously. If an undue amount of time elapses during which no mark or space tones are detected, a reset control 218 which combines the outputs of the mark and space tone detectors 214 and 216 cooperates with a time delay 220 to reset the 20-bit shift register 208. The time delay 220 is continuously re-initiated by the reset control 218 each time a mark or a space tone is detected, and only generates a reset command when no mark or space tone is received during an abnormally long interval of time.

The output of the sync tone detector 212 is fed into a clock shaper and gate 214 and causes the shaper and gate 214 to initiate a clock pulse. The clock pulse enables the 20-bit shift register 208 to accept a data bit from the shift register data input terminal. The mark or space tone which normally follows each sync tone causes a pulse to emanate from one of the detectors 214 or 216 which pulse either sets or resets a mark/space flip-flop 222. The data output of the flip-flop 222 is applied to the data terminal of the shift register 208. In response to a mark or space tone, the reset control 218 generates a pulse which causes the clock shaper and gate 214 to terminate the clock pulse. This termination of the clock pulse causes the data presented by the mark/space flip-flop 222 to be shifted into the first data storage location within the shift register 208 and also causes the contents of all other storage locations within the shift register 208 to be shifted forward one storage location within the shift register 208. It may be seen that when a series of mark and space tones separated by sync tones are supplied to the receiver 210, the data represented by the mark and space tones is loaded serially into the shift register 208. In this manner, a message containing twenty bits of tone-coded data may be quickly and accurately transferred into the shift register 208.

The shift register 208 presents its contents in parallel. 16 of the the twenty parallel outputs of the shift register 208 are subjected to decoding by a last frame decoder 224, and address decoder 226, and a first frame decoder 228. Outputs from these three decoders 224, 226, and 228 are fed into a transmitter start/stop control 230. The control 230 takes no action unless each of the decoders 224, 226, and 228 indicates that it is receiving the precise bit pattern to which it is programmed to respond. Typically, the last frame decoder 224 is programmed to detect framing codes which may be present in any valid transmission and which insure that a 20-bit message is properly positioned within the shift register 208. The address decoder 226 and the first frame decoder 228 may then be used to identify an address code which is unique to the transceiver 200. In this manner, over 4,000 different transceivers may be individually addressed. The transceiver 200 is designed to reject any incoming message which does not contain the proper last frame code and the proper address code.

When a message is received that contains the proper last frame code and the address code of the transceiver 200, the transmitter start/stop control 230 responds by generating an address verify signal which is sent back to a command output gate 232. The address verify signal enables the command output gate 232 to pass four bits of command information or data from the shift register 208 to the command outputs 202 of the transceiver 200. In this manner, a 4-bit command output signal is passed on to some external device that is connected to the transceiver 200. The command output signal may either be supplied directly to apparatus which is to be controlled, or it may be supplied to other modules which are used in conjunction with the transceiver 200 module and which are described below.

When a properly addressed message is received, the transmitter portion of the transceiver 200 is automatically placed into operation to prepare a return message for transmission. The transmitter start/stop control 230 initiates operation of a start delay circuit 231. The start delay circuit 231 delays the start of the return transmission and thus enables the command output signal to cause some action to be taken before status data is transmitted by the transceiver. After the expiration of an appropriate time delay interval, the start delay circuit 231 generates a reset signal which is applied to the reset inputs of the shift register 208 to clear the shift register 208 of data. The start delay circuit 231 then generates a strobe pulse. The strobe pulse is applied to an array of data input gates 234 which connect twenty data lines to parallel data inputs of the 20-bit shift register 208. The start delay circuit 231 also supplies enabling signals to a transmit clock 236 which clock controls the timing of tone signal transmissions, and to a tone gate 240 which gate connects a tone transmitter 238 to a transmitter audio output terminal 242. In this manner, the transmission of return data is automatically initiated.

Of the twenty data lines which connect to the register 208 through the data input gates 234, the four left-most and right-most data lines simply convey invariant frame bit codes to the first four and the last four shift register stages. The twelve data lines which supply data to the twelve central shift register stages convey twelve bits of data from a source external to the transceiver 200 over what are called the 12-bit data inputs 204 to the transceiver 200. The twelve bits of data may come from alarm and other remotely located sensing and monitoring devices, or the 12 bits of data may come from other modules which are connected to the transceiver module 200. The frame bits enable the 20-bit message to be properly positioned within a shift register device similar to the shift register 208 within a receiver at a central location to which the return message is directed.

The transmit clock 236 controls the timing of each transmission. The clock 236 supplied clock pulses directly to the 20-bit shift register 208 so that successive data bits are presented from the shift register 208 to a data line 244 for presentation to a tone transmitter 238. The transmit clock 236 supplies synchronizing pulses to the tone transmitter 238 and causes the tone transmitter 238 to generate 1,000 cycle synchronizing tone bursts whenever a synchronizing pulse is present. When a synchronizing pulse is absent, the tone transmitter 238 generates an 800 or 900 cycle tone depending upon whether a "0" or a "1" data bit is presented on the data line 244 to the tone transmitter 238. The relative timing of the sync pulses generated by the transmit clock 236 and of the clock pulses generated by the transmit clock 236 are adjusted so that the tone transmitter 238 is caused to generate a tone modulated signal of the type which has already been described. The tone modulated signal passes through the tone gate 240 and becomes the audio output signal 242.

When all of the twenty bits of data have been transmitted, the presence of zero data bits within the right-most 15 bit positions of the shift register 208 causes a space detector circuit 246 to generate a stop signal which resets the transmitter start/stop control 230 and places the transceiver module 200 back into condition to receive the next data transmission.

The transceiver 200 is designed to be used conveniently with a two-way radio transceiver system. In order to enable the transceiver 200 to shift a radio transceiver system from the receive mode to the transmit mode, a relay 248 is provided and is actuated by the transmitter start/stop control 230. The relay 248 has a plurality of contacts associated with it which may be used in any desired manner. While not shown in FIG. 2, switching signals may also be derived from the transceiver 200 to facilitate interaction between the transceiver 200 and other devices.

The transceiver 200 is also suitable for use at a central location to initiate communications with a plurality of remotely located transceiver units. For this purpose, a large number of the interconnections shown in FIG. 2 are established by interconnections between the terminals of a wire wrap panel into which the transceiver 200 shown in FIG. 2 is inserted or plugged. If the transceiver 200 is to be used at a central location, then the right-most twelve signal lines which enter the data input gates 234 are supplied with the address code of the remote unit to which a transmission is addressed. A four bit command that is to be supplied to the addressed remote unit is presented to the next four signal lines to the left, and an appropriate frame bit pattern is presented to the left-most four signal lines. Transmission of this data is then initiated by application of an appropriate signal to the transmitter start/stop control 230. After a delay interval, the transceiver to which the message is addressed returns 20 bits of data to the receiver 210 shown in FIG. 2. The 20 bits of return data are loaded into the shift register 208, as has been described. Through connections established between the terminals of the wire wrap panel, the outputs of the first frame decoder 228 and of the last frame decoder 224 are combined into a signal which indicaes when a 20-bit message has been successfully received and is properly positioned in the register 208. This signal may cause some external device to accept the 12 center-most bits of data from the parallel outputs of the 20 -bit shift register 208. In the preferred embodiment of the invention, outputs from the 16 right-most bit positions within the shift register 108 are provided. Other configurations of the transceivers may also be visualized in which transceivers are designed to interrogate one another and to carry out two-way conversations similar to those which might be carried out over a party line telephone system.

Figure 3:
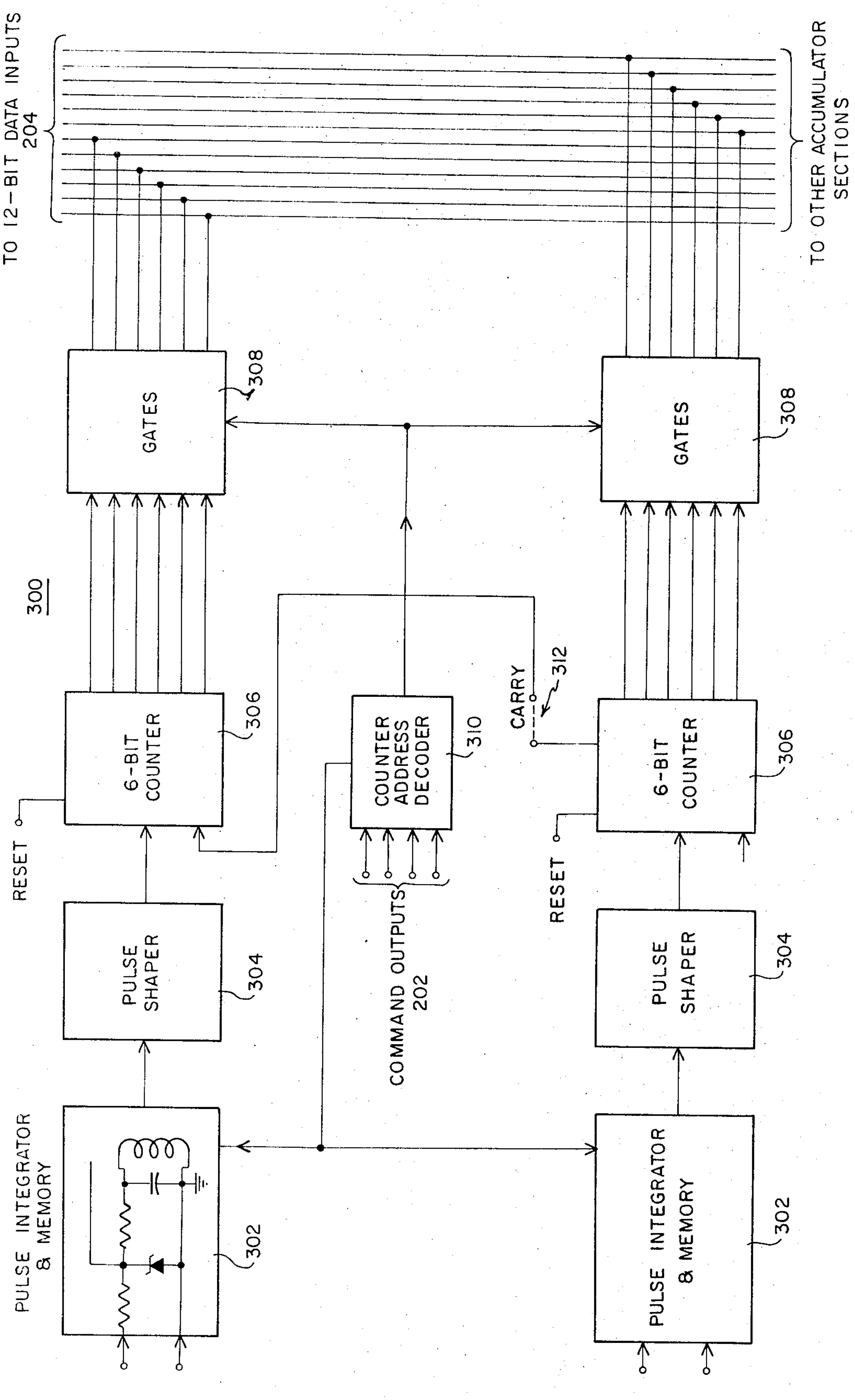
FIG. 3 is a block diagram of an accumulator module designed in accordance with the present invention.

Referring now to FIG. 3, there is illustrated a portion of an accumulator module 300 which is designed to be used in conjunction with the transceiver 200 shown on FIG. 2. The accumulator module allows the occurrences of events to be counted. For example, it may be desirable to know the quantity of oil which is pumped out of a particular well at a remote location. If a pulse generator can be arranged to generate a number of pulses which is proportional to the amount of oil that is pumped, the pulses may be fed into an accumulator module and may be counted. A transceiver module may then be arranged to transfer the total count back to a central location at periodic intervals. In this way, a record of the amount of oil pumped may be maintained at the central location. In the preferred embodiment of the invention, ten accumulators or counters are contained within each accumulator module. Each of the ten counters is a 6-bit binary counter that is capable of counting from 0 to 63. If desired, pairs of counters may be connected together to form 12-bit counters which may count from 0 to 4,095.

In FIG. 3, two counters 306 of the ten counters which may be found in a typical counter module 300 are shown as illustrative of all ten counters. Each counter 306 is connected by a pulse shaper 304 to a pulse integrator and memory input 302. Briefly stated, the pulse integrator and memory inout 302 comprises a relay which is given a controlled time constant so that the relay responds only to input pulses which endure for at least 20 milliseconds. Once actuated, the relay is designed to remain closed for forty milliseconds before again opening, and thus may act as a short-term memory. As shown in FIG. 3, the input windings to the relay are connected to external event contacts (not shown) by resistors and capacitors which control the response time of the relay. A Zener diode is provided to protect the relay coil from excessively high currents.

When a relay within a pulse integrator and memory 302 is actuated, its contacts make and break a circuit which connects to the input of the pulse shaper 304. The pulse shaper 304 is basically a differentiating circuit. A pulse output of the pulse shaper 304 is applied to the count input of the 6-bit counter 306. The six output signal lines from the counter 306 are passed through an array of 2-input gates 308 to six of the 12-bit data inputs 204 to the transceiver 200. In FIG. 3, the uppermost counter 308 supplies six bits of data to the leftmost six 12-bit data inputs 204, and the lower-most counter 308 supplies six bits of data to the right-most six 12-bit data inputs 204.

A single address decoder 310 common to both of the counters 308 is connected to the command outputs 202 of the transceiver 200. The decoder 310 is designed to respond only when a particular bit pattern is presented by the command outputs 202. In response to the proper bit pattern, the decoder 310 enables the gates 308 to pass the 12 bits of counter data to the 12-bit data inputs 204.

To prevent the counter 306 from advancing while the gates 308 are open and to prevent the loss of any counts which might occur during a period when the gates 308 are open, the decoder 310 supplies a signal to the pulse integrator and memory 302 which signal causes the pulse integrator and memory 302 to prevent the relay within the pulse integrator and memory 302 from operating until after the gates 308 are again open.

The two counters 306 shown in FIG. 3 may be strapped together, as is illustrated by a broken line at 312, to function as a single 12-bit counter. The counters 306 also include reset terminals to which a reset pulse may be supplied from a command output of a multiplex module which appears in FIG. 5A and which is described below.

Figure 4:
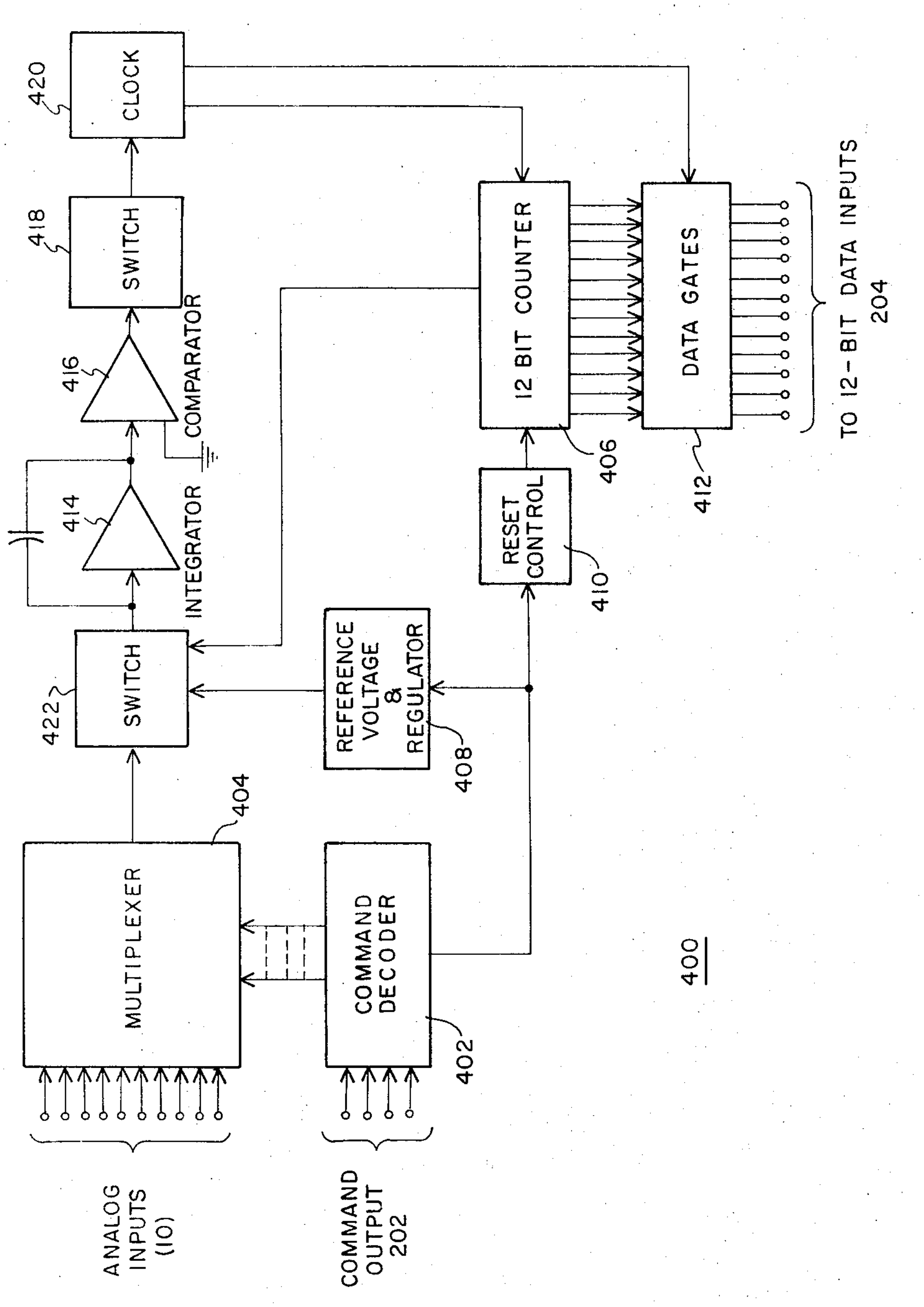
FIG. 4 is a block diagram of an analog-to-digital converter module designed in accordance with the present invention.

FIG. 4 illustrates an analog-to-digital converter module which is designed to be used in connection with the transceiver 200 shown in FIG. 2 and which is identified by the reference number 400. In brief summary, the analog-to-digital converter module 400 is a conventional up-down integrating converter having a multiplexer 404 at its input which allows the selection of any one of ten analog signal inputs. The converter generates a 12-bit binary number output which appears at the output of a counter 406.

A command decoder 402 is connected to the command outputs 202 of the transceiver module 200. The command decoder 402 translates any one of ten selected 4-bit binary numbers supplied by the command outputs 202 into one of ten signals all of which are supplied to the multiplexer 404. The selected signal determines which of the ten analog input signals to the converter is connected to the converter. The command decoder 402 also generates control signals which are fed to other elements of the analog-to-digital converter and which place the converter into operation. Each time the analog-to-digital converter is placed into operation, the digital magnitude of a selected signal is computed by the converter and is tranferred through an array of gates 412 to the 12-bit data inputs 204 of the transceiver module 200.

Briefly described, the analog-to-digital converter portions of the module 400 include an integrator 414, a comparator 416, a switch 418, a clock 420, and a switch 422. When the command decoder 402 initially places the analog-to-digital converter into operation, the command decoder supplies a signal to a reset control 410 which resets the 12-bit counter 406 to zero count. The command decoder 402 also initiates the operation of a reference voltage and regulator 408. The reference voltage and regulator 408 supplies a constant reference current to the switch 422. The multiplexer 404 is also programmed by the command decoder 402 to connect one of the analog input signals to the switch 422, as has been explained.

When the counter 406 is reset, the switch 422 connects the analog signal output of the multiplexer 404 to an input of the integrator 414 and thus causes the integrator 414 output to rise or fall at a rate which is dependent upon the magnitude of the analog input signal. This rising or falling integrator output causes the comparator 416 to actuate a switch 418 which initiates operation of a 61,440 Hz. clock 420. Pulses generated by the clock 420 are counted by the counter 406.

The integrator 414 is allowed to integrate the incoming analog signal for the time it takes pulses from the clock 420 to advance the counter 406 to a full count of 4,096. This time interval is one-fifteenth of a second and is intentionally chosen to be an even multiple of one-sixtieth of a second so that 60 cycle fluctuations on the incoming analog signal line will tend to cancel themselves out.

When a count of 4,096 is reached, the counter 406 resets to zero count and supplies a signal to the switch 422 which causes the switch 422 to disconnect the incoming analog input signal from the integrator 414 and to connect the integrator 414 instead to the constant current which flows from the reference voltage and regulator 408. The sign of the constant current from the reference voltage and regulator 408 is intentionally chosen to be opposite to the sign of current which flows from the multiplexer 404.

The integrator 414 output now rises or falls in the opposite direction at a rate which is determined by the magnitude of the constant current, and the counter 406 continues to count the number of pulses which are generated by the clock 420. When the integrator 414 output reaches ground level once again, the comparator 416 causes the switch 418 to disable the clock 420. The 12-bit counter 406 is then left presenting a binary number whose size is proportional to the magnitude of the incoming analog signal. The clock 420 then opens the data gates 412 which connect the digital output of the counter 406 to the 12-bit data inputs 204 of the transceiver 200. While not indicated in FIG. 4, it is to be understood that the data gates 412 are only open for a sufficient length of time to enable the transceiver 200 to accept the counter output.

A negative source of supply voltage is desirable to power the reference voltage and regulator 408, the integrator 414, and the comparator 416. Since the invention is designed to operate off of a 12-volt battery, the clock 420 includes a D.C.-to-D.C. converter which draws upon a positive 12-volt D.C. supply and generates a negative 12-volt D.C. supply which is used to power these elements. The design of the D.C.-to-D.C. converter is conventional and is not shown in the figures.

Figure 5A:
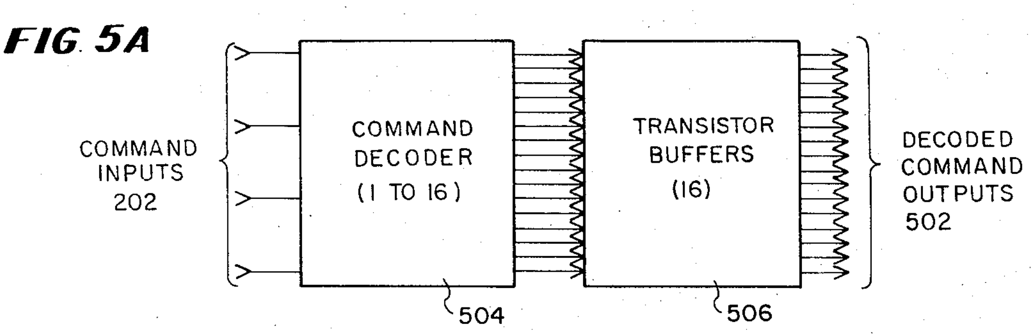
FIG. 5A is a block diagram of a decoder logic which forms a portion of the multiplexer module.
Figure 5B:
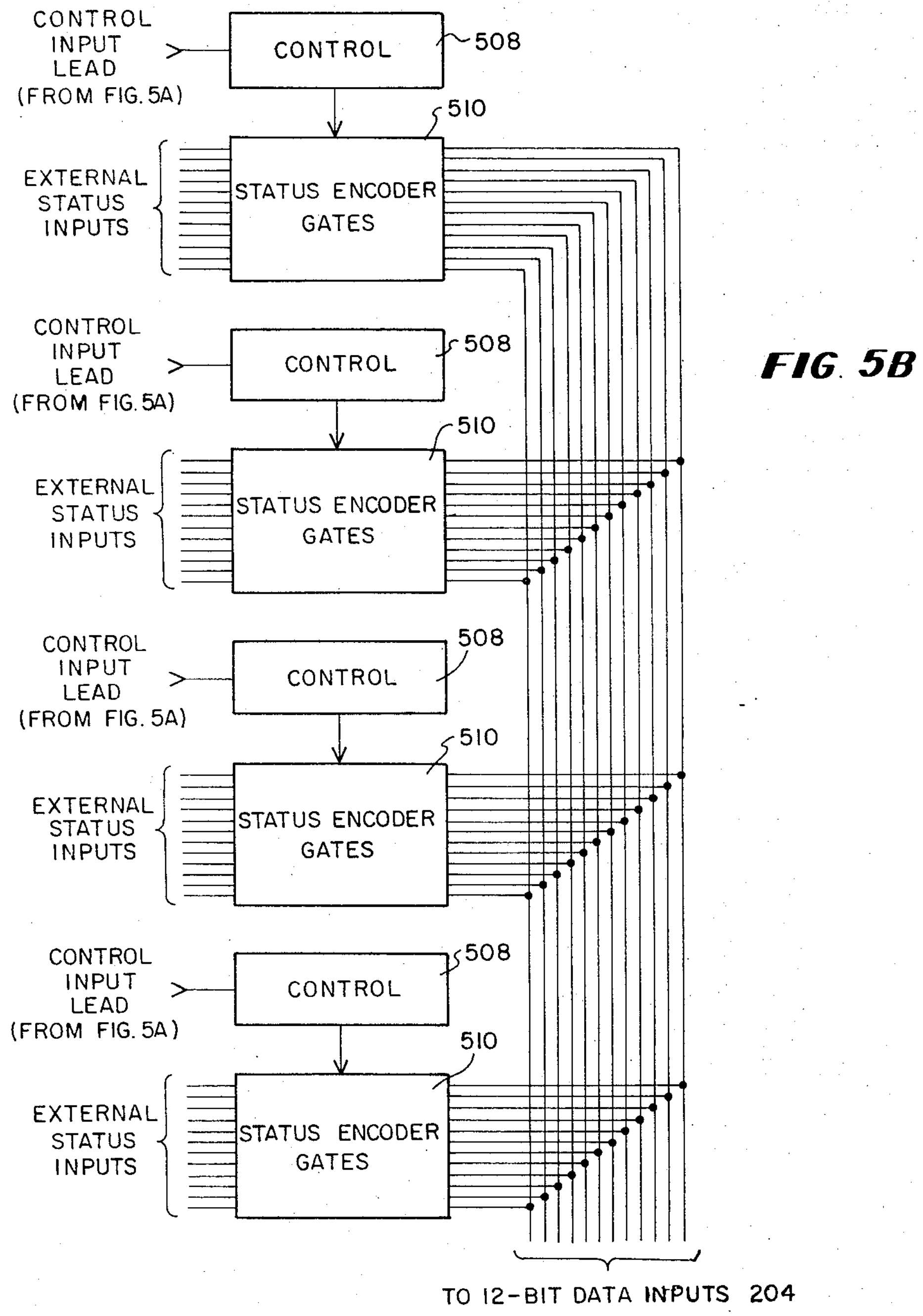
FIG. 5B is a block diagram of a plurality of gates interconnecting sets of twelve Boolean data input signals to the twelve-bit data inputs of the transceiver module and which forms a portion of the multiplexer module.

A multiplexer module designed for use with the transceiver 200 is illustrated in FIGS. 5A and 5B. In brief, the multiplexer circuitry which appears in FIG. 5A expands the capability of an inidividual transceiver to generate control signals at a remote site from a basic capability to generate up to 4 signals to an expanded capability to generate up to 16 independent signals. The multiplexer circuitry which appears in FIG. 5B expands the capability of an individual transceiver to accept digital data from a basic capability to accept 12 bits of data to an expanded capability to accept 48 bits of data in groups of 12 bits each.

FIG. 5A is a block digram of circuitry which interprets a 4-bit binary number presented at the command outputs 302 of the transceiver and which then actuates a corresponding one of sixteen signal lines which are collectively called the decoded command outputs 502. Each of the decoded command outputs thus corresponds to one particular 4-bit binary number. The circuitry shown in FIG. 5A effectively expands the number of control signals which a transceiver may generate from four signals to sixteen signals, and thus multiplies by four the number of independent control actions which a single transceiver may initiate.

The circuitry in FIG. 5A includes a conventional 4-bit binary to one of sixteen decoder 504 which accepts a 4-bit binary input from the command outputs 202 of a transceiver 200 and which generates 16 output signals. The 16 output signals are connected to the decoded command outputs 502 by transistor buffer amplifiers at 506. The individual decoded command outputs may be used in any desired manner to initiate control actions at a remote location. Some of the decoded command outputs may be fed to the circuitry shown in FIG. 5B and used to initiate the retrieval of 12-bit data sets from the remote site.

FIG. 5B is a block diagram of circuitry which accepts 48 bits of digital data and which transfers groups of twelve bits of data to the 12-bit data inputs 204 of a transceiver 200. Each group of 12 incoming data bits, called "EXTERNAL STATUS INPUTS" in FIG. 5B, is connected to the 12-bit data inputs 204 of the transceiver 200 by a plurality of two-input gates called status encoder gates 510. A control 508 having a command input lead is provided for each array of 12 status encoder gates 510 to simultaneously enable all of the gates in an array in response to a signal which is received over the control input lead. Typically, the control input leads are connected to selected ones of the decoded command outputs 502. When so connected, a transceiver module and a multiplexer module in combination may return to a central location the status of any group of twelve digital values in response to a command from the central location which is addressed to the transceiver and which contains a 4-bit binary command code that corresponds to a decoded coammand output (FIG. 5A) which causes the desired set of 12 digital values to be presented to the transceiver data inputs 204.

The data gathering modules illustrated in FIGS. 3, 4, and 5 may be used individually with individual transceivers. It is also intended that the data gathering modules be used in pairs so as to increase the flexibility of any given data transceiver, if such increased flexibility is desirable and justifiable. To facilitate the grouping of an accumulator module with an analog-to-digital converter module, the two types of modules have been intentionally designed to respond to different combinations of transceiver command output signals so that a command directed to an accumulator module cannot initiate the operation of an analog-to-digital converter module and vice versa.

The accumulator module contains ten 6-bit counters. The accumulator module responds to five different command words. In response to each of the five command words, the accumulator module is programmed to present the count output of two counters to the transceiver data inputs 214. The assignment of counters to command words is as follows:

| COUNTERS | COMMAND WORDS |
|---|---|
| **1** and **2** | $1011_2$ |
| **3** and **4** | $1100_2$ |
| **5** and **6** | $1101_2$ |
| **7** and **8** | $1110_2$ |
| **9** and **10** | $1111_2$ |

The analog-to-digital converter module responds to ten different command words. In response to each of the ten command words, the analog-to-digital converter module presents, in digital form, the magnitude of one of ten analog input signals to the transceiver data inputs 214. The assignment of analog signal inputs to command words is as follows:

| | |
|---|---|
| Analog input No. 1 | $0000_2$ |
| Analog input No. 2 | $0001_2$ |
| * * * | |
| Analog input No. 9 | $1001_2$ |
| Analog input No. 10 | $0000_2$ |

The analog-to-digital converter module uses the command words which correspond to the decimal numbers 0–9, while an accumulator module uses the command words which correspond to the decimal numbers 11–16. Thus, when an analog-to-digital converter module and an accumulator module are both connected to a common transceiver module, there is no overlap of the command words used by the two data gathering modules. The command word correspond to the decimal number 10 ("$1010_2$") remains available.

The multiplexer module illustrated in FIGS. 5A and 5B decodes all the possible combinations of command words and therefore may be used in combination with either an analog-to-digital converter module or with an accumulator module. if certain stages of the analog-to-digital converter are not used, or if several accumulators within an accumulator module are not used, then all three types of modules may be used with a single transceiver module. However some rewiring of at least one module is necessary to achieve such a combination with the preferred embodiment of the invention.

A detailed schematic diagram of the transceiver module 200 is presented in FIGS. 6A, 6B, 6C, and 6D. The four figures are assembled into a complete schematic diagram in the manner illustrated in FIG. 6E which figure appears in the lower left-hand corner of FIG. 6D.

The transceiver 200 is constructed in part of conventional circuit components, such as resistors, capacitors, inductors, transistors, diodes, transformers, and relays; and it is constructed in part of integrated circuits, both digital and analog. All components used in constructing the transceiver 200 are conventional, and equivalent components may be freely substituted into the circuit. Cos/Mos digital integrated circuits have been selected for use in constructing the present invention because of the extremely low current drain of that line of logic circuits. Any other line of low-current-drain logic may be used as well. As a result, it is possible for a complete remote facility to be operated off of 12-volt dry cell batteries with the batteries only being replaced at one year intervals. If remote units are not to be powered by dry cells, then bipolar transistor digital integrated circuits may be used in its construction.

In representing logic gates in FIGS. 6A through 6D, the following convention has been followed: a high level, true, or "1" signal corresponds to a ground potential level signal; and a low level, false, or "0" signal corresponds to a signal that is positive with respect to ground. Conventional logic symbols have been used in the schematic diagram. A "D" shaped symbol corresponds to an AND logic function, whereas a gate which is arrow shaped corresponds to an OR logic function. A circle at the output of a gate indicates inversion, and a triangular symbol indicates amplification.

A NAND logic gate is represented by a "D" shaped symbol having a circle at the curved end of the "D" which represents the gate output. With respect to such a gate, a low level, false, "0," or positive signal is generated at the gate output in response to high level, true, "1," or ground level signals being applied to all of the gate inputs. Any other combination of signals at the gate input produces a high level, true, "1," or ground level output from the gate.

An OR logic gate is represented by an arrow shaped gate symbol. With respect to such a gate, when all of the gate inputs are at a low level, false, "0," or positive level, the gate output also goes to a low level, false, "0," or positive level. For all other combinations of input signals, the gate output goes to a high level, true, "1," or ground level.

Inverting amplifiers are represented as triangles having a circle at the tip or output end of the triangle. Inverting amplifiers simply invert any signal which they pass—a positive level signal is converted to a ground level signal, and vice versa. Larger triangles are used to represent conventional high-gain operational amplifiers having both non-inverted and inverted input terminals.

Figure 6A:
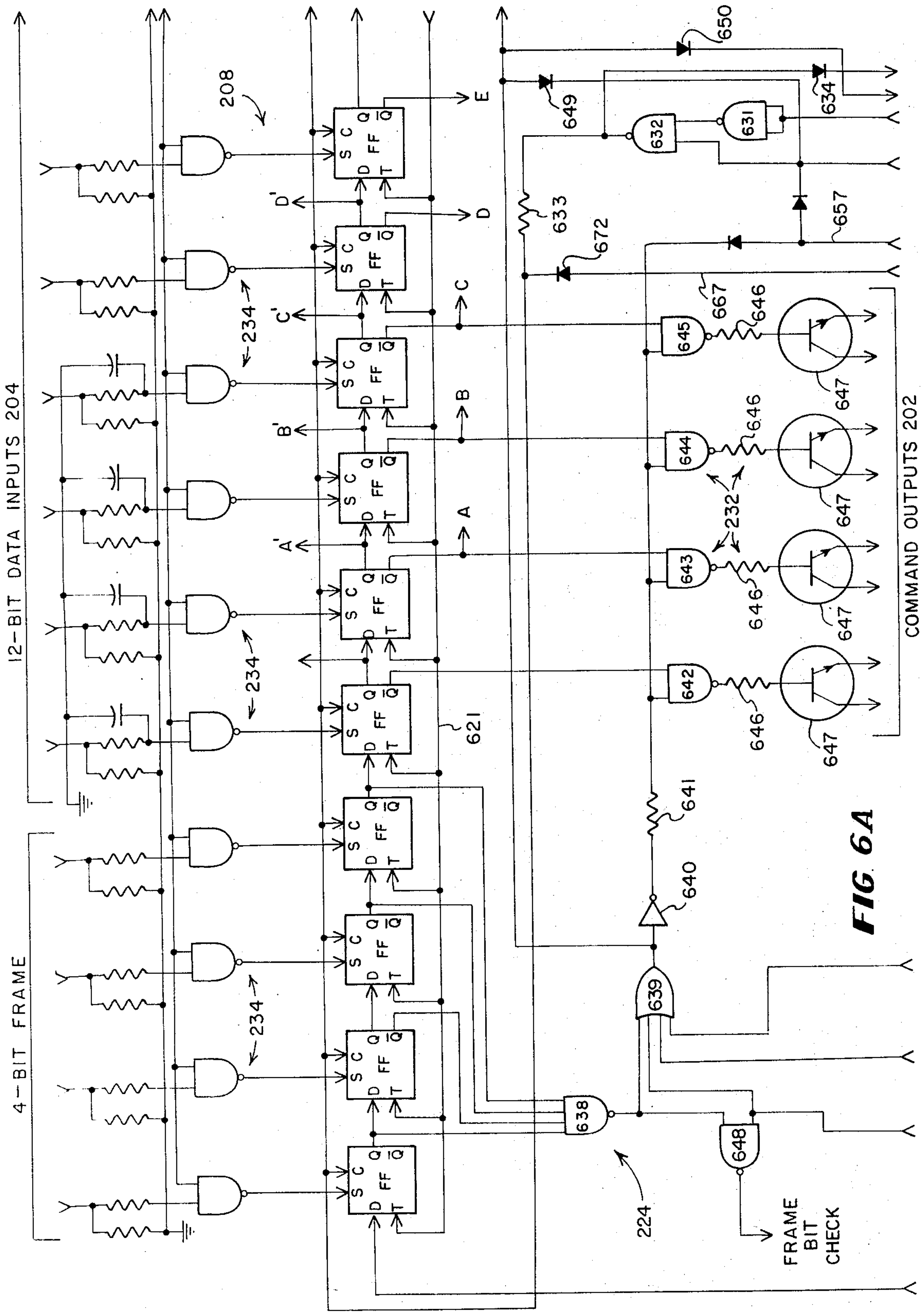
FIGS. 6A, 6B, 6C, and 6D, when assembled in accordance with FIG. 6E, form a partly schematic and partly logical diagram of the transceiver module which is shown in block diagram form in FIG. 2.
Figure 6B:
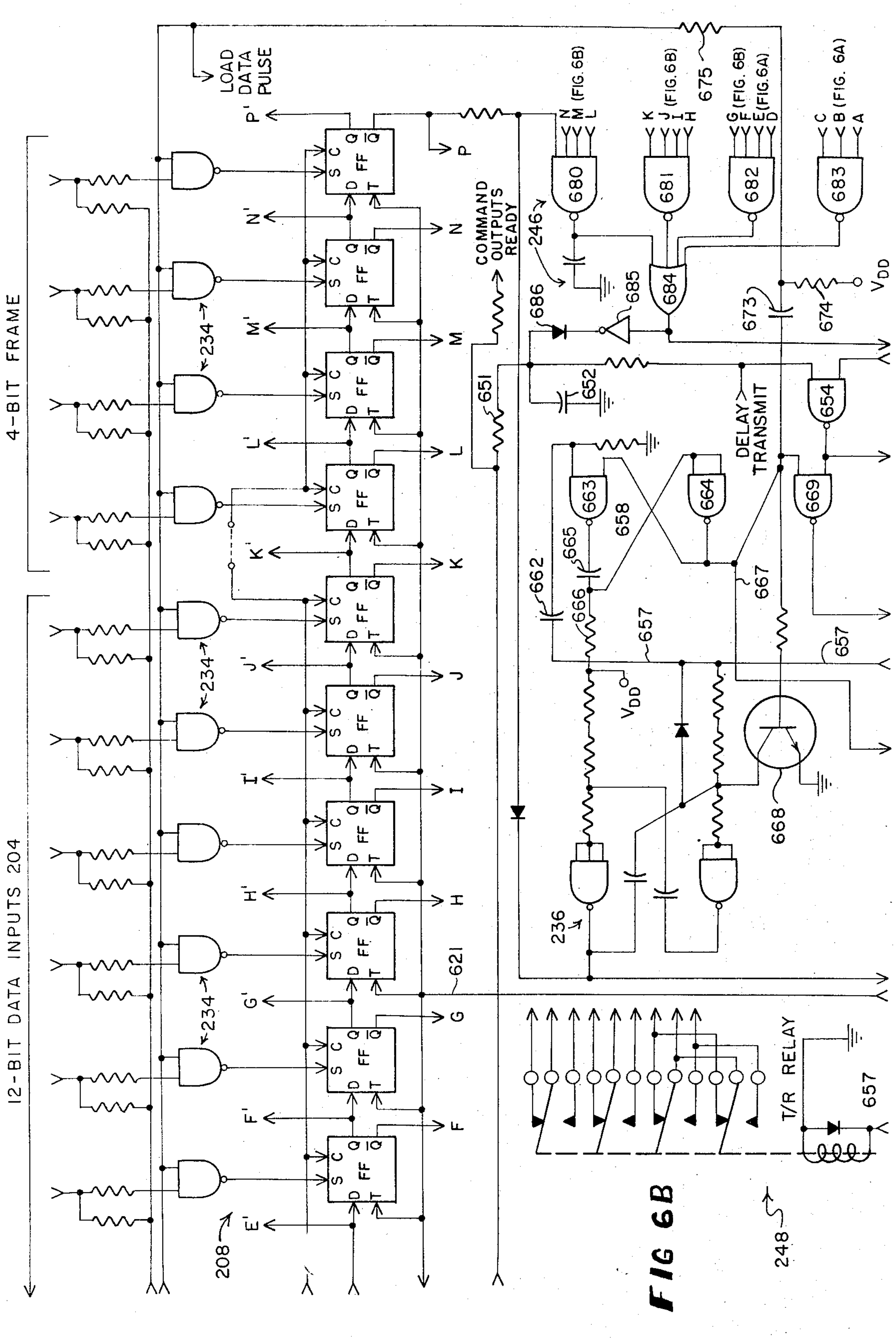
Figure 6C:
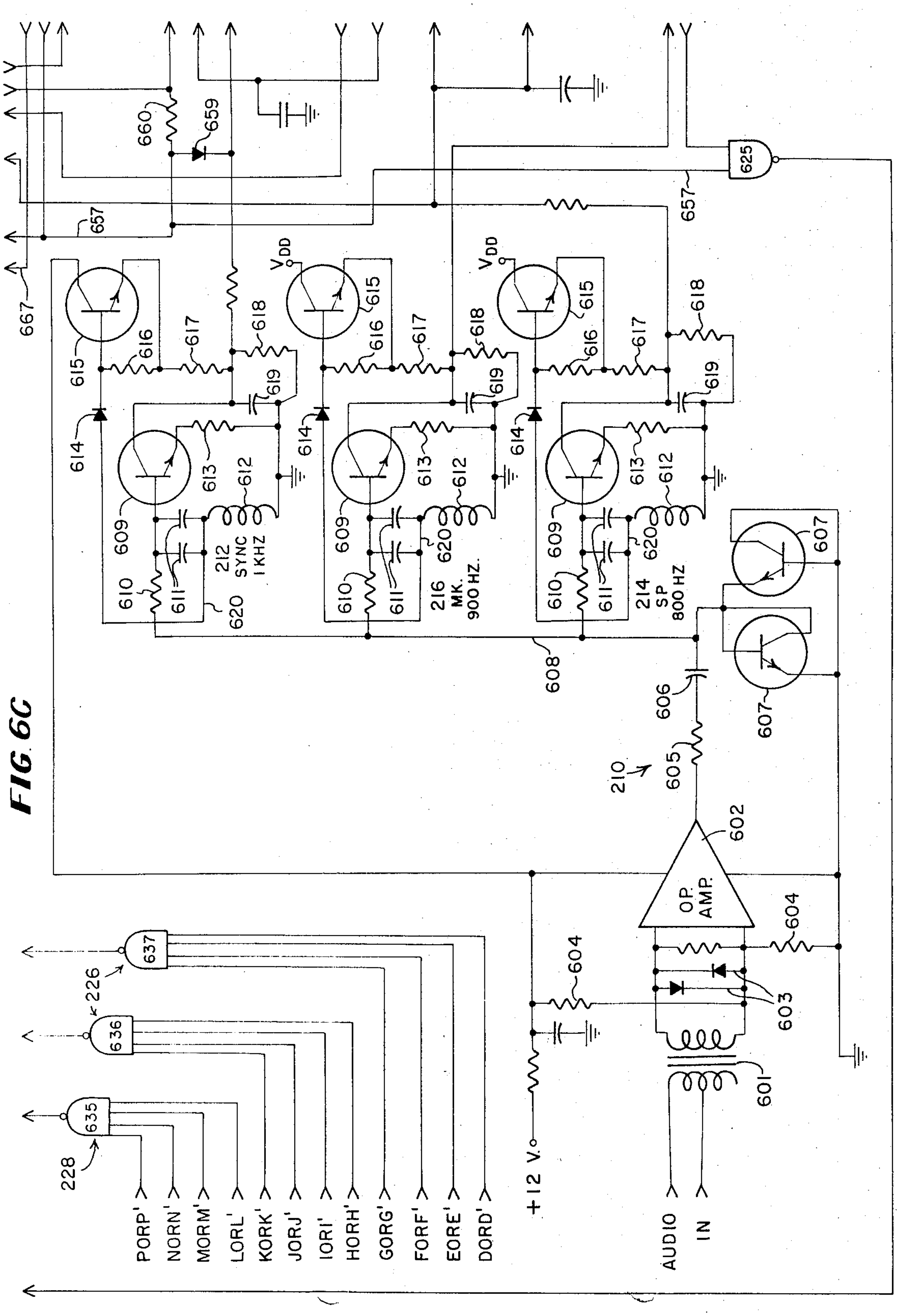

Referring now to FIG. 6C, an audio input signal to the transceiver 200 is applied to the primary of a transformer 601. The secondary of the transformer 601 connects to the two inputs of an operational amplifier 602. To protect the input of the operational amplifier 602 from excessively high level input signals, a pair of diodes 603 are connected back-to-back across the inputs of the operational amplifier 602. Resistors 604 keep the input potential of the operational amplifier 602 within a reasonable operating range for the amplifier 602.

The amplified output of the amplifier 602 is applied through a series resistor 605 and a capacitor 606 to a complementary pair of transistors 607 which are connected as diodes (base connected to collector) and which are also connected back-to-back to form a limiting circuit which clips both positive and negative outputs of the amplifier 602. All of the elements just described correspond to the receiver 210 shown in FIG. 2.

The amplified and limited output of the receiver 210 is applied by a signal line 608 to the tone detectors 212, 214, and 216. The tone detectors are identical to one another, except that each is tuned to a slightly different frequency, as has been explained. The corresponding components of the three tone detectors are numbered with corresponding reference numbers so that a description of one tone detector may suffice as a description of all the tone detectors.

The incoming signal from the line 608 is fed through a resistor 610 to a series-tuned circuit comprising a capacitor 611 connected in series with an inductor 612 between the resistor 610 and ground. The signal developed at a node 620 common to the capacitor 611 and to the inductor 612 is rectified by a diode 614 and is applied by a transistor common-collector amplifier 615 to a charge storage capacitor 619 through a resistor 617.

When a signal is present upon the line 608 having a frequency close to the natural resonant frequency of the elements 611 and 612, a high level A.C. potential is developed at the node 620 and a positive potential develops across the capacitor 619. The resistor 617 limits the speed with which the capacitor 619 is charged and thus prevents the capacitor 619 from being charged by a signal whose duration is shorter than about 3 milliseconds or so. To the extent that the signal line 608 presents frequency components other than or in addition to the frequency to which a particular detector is tuned, the resonant circuit comprising the capacitor 611 and the inductor 612 present a relatively high impedance to such other frequency components and thus allow such other components to be applied to the base of a transistor amplifier and rectifier 609. The collector of the amplifier and rectifier 609 is connected to the capacitor 619 in such a manner as to discharge the capacitor 619 through a resistor 613. The circuit values are adjusted so that the capacitor 619 may be charged only if a signal frequency component to which a particular detector is tuned is about 6 decibels larger than the sum of other energy components which are presented by the signal line 608. If the other energy components predominate, the capacitor 619 is not charged and the tone detector does not respond even though a tone signal of the proper frequency may be presented.

The shift register 208 appears in the central portion of FIGS. 6A and 6B and comprises a plurality of single-input-terminal flip-flops ("FF") interconnected with the Q or non-inverted output of each flip-flop connecting to a D or data input of the next flip-flop in the shift register. The T or toggle inputs of all the flip-flops are connected to a clock signal line 621. Data pulses for application to the clock signal line 621 come either from a transmit clock 236 which appears in FIG. 6B or else from the clock shaper and gate 214 which appears in FIG. 6D. In either case, the clock signals pass through a gate 623 (FIG. 6D) and are applied to the line 621.

The clock shaper and gate 214 (FIG. 6D) comprises a simple bistable or set/reset flip-flop 622 which is formed by interconnecting the inputs and the outputs of a pair of gates 624 and 624'. In response to the receipt of each synchronizing tone signal, the sync tone detector 212 supplies an output signal which sets the flip-flop 622 and causes a positive potential to be applied to the line 621 which enables all of the flip-flops comprising the shift register 208 to receive data at thier "D" or data input terminals. Each time a mark or a space tone signal is received, a "1" (for a mark) or a "0" (for a space) data bit is presented to the D input of the first flip-flop within the shift register 208 and the flip-flop 622 is cleared. The signal upon the clock signal line 621 goes to ground potential and causes the "1" or "0" data bit to be loaded into the first flip-flop within the shift register 208. In addition, the ground potential level signal on the line 621 causes all of the data that is stored within the shift register 208 to be shifted forward within the shift register 208.

Figures 6D, 6E:
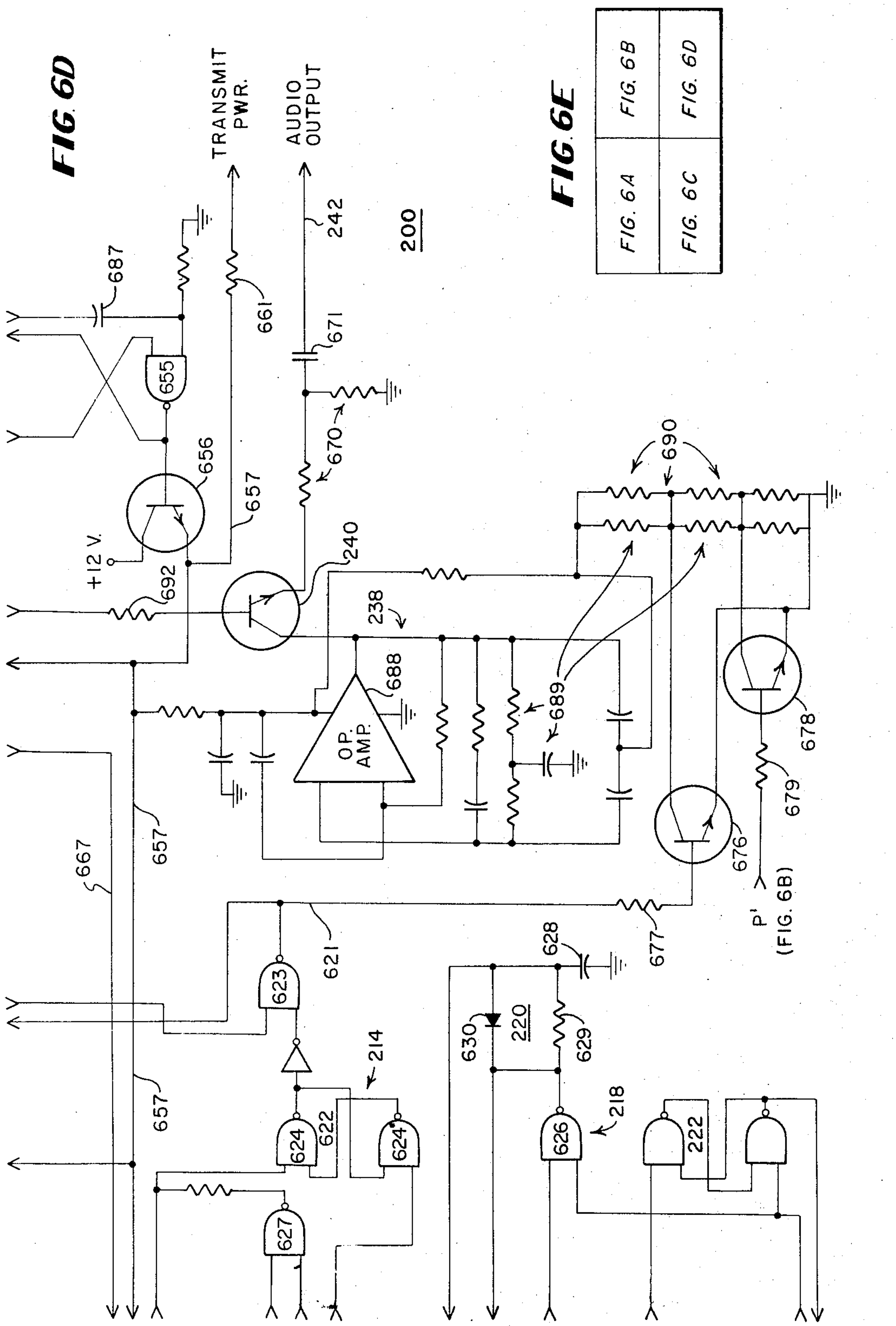

In response to the receipt of a mark or a space tone signal, either the space tone generator 214 or the mark tone generator 216, both of which appear in FIG. 6C, generates a positive level signal output across the capacitor 619 and either sets or clears a mark/space flip-flop 222 which appears in the lower left-hand corner of FIG. 6D. The output of the flip-flop 222 passes through a gate 625 in FIG. 6C and is applied to the D input of the first flip-flop within the shift register 208 at the left-hand edge of FIG. 6A. The outputs of the mark and space tone detectors 214 and 216 are also fed into a gate 626 which forms a portion of the reset control 218 and which appears in the central left-hand portion of FIG. 6D. The output of the gate 626 passes through a gate 627 and clears the flip-flop 622 within the clock shaper and gate 214 and thus shifts the potential of the line 621 to ground potential, as has already been noted. The transceiver module 200 is now ready to receive another synchronizing tone signal.

If sufficient time elapses during which no mark or space tone is detected by the circuits 214 and 216, a capacitor 628 is charged through a resistor 629 from the normally positive level output of the gate 626. The capacitor 628 and the resistor 629 comprise the time delay 220 shown in FIG. 2. Whenever a mark or a space code pulse appears, the output of the gate 626 goes to ground potential and a diode 630 discharges the capacitor 628 and reinitiates the timing operation. If sufficient time elapses without the capacitor 628 being discharged, the potential developed across the capacitor 628 causes a gate 631 (shown in the lower right-hand corner of FIG. 6A) to generate a low level signal which passes through and is inverted by a gate 632 and which then passes through a resistor 633 to the clear or reset terminals of the flip-flops which comprise the shift register 208. In this manner, the shift register 208 is completely cleared if a mark or a space tone is not received after a time interval whose length is determined by the time constant of the resistor-capacitor combination of elements 628 and 629. The output signal from the gate 632 is also fed through a diode 634 back to the flip-flop 622 shown in the upper left-hand corner of FIG. 6D to clear the flip-flop 622 to prevent the transceiver from accepting any further mark or space tone signals until after the receipt of the next synchronizing signal.

The circuitry just described accepts an audio input signal and loads information carried by the audio input signal into the shift register 208. After 20 bits of data have been loaded into the shift register 208, a plurality of logic gates shown in the upper left-hand corner of FIG. 6C and in the lower left-hand corner of FIG. 6A determine whether or not the twenty bits comprise a signal which is addressed to this particular transceiver 200 and whether or not the signal is properly framed. Three logic gates 635, 636, and 637 shown in the upper left-hand corner of FIG. 6C comprise the first frame decoder 228 and the address decoder 226. A logic gate 638 shown in the lower left-hand corner of FIG. 6A comprises the last frame decoder 224.

The last frame decoder gate 638 is shown having four inputs connected to selected normal and inverted outputs of the first four flip-flops within the shift register 208 so as to cause a high level signal to appear at the output of the gate 638 only when the pattern of bits within the four flip-flops is such that all of the inputs to the gates 638 are at ground potential. The particular interconnection shown correspond to the frame code "1011." Of course, any other suitable frame code could also be used.

The inputs of the gates 635, 636, and 637 are similarly interconnected to either the normal or inverted outputs of the remaining flip-flops within the shift register 208 excepting the four flip-flops corresponding to the command word portion of a twenty bit message. The interconnections between the gates 635, 636, and 637 and the outputs of the flip-flops within the shift register 208 are established by wire-wrap connections to terminals of the transceiver module and are thus programmable. Because the coding connections are not on the module 200 itself, the module may be replaced with a different transceiver module 200 without any necessity for adjusting the different module in any way.

If the proper frame and address codes are present within the shift register 208, then positive outputs are generated by all of the gates 635, 636, 637, and 638. These positive outputs are applied to a gate 639. The gate 639 generates a positive output only when all of its inputs are also positive. This positive output is inverted by an inverting gate 640 and is applied through a resistor 641 to plurality of gates 642, 643, 644, and 645 which together comprise the command output gate 232 shown on FIG. 2. Hence, if the address and frame portions of the twenty bits of data are correct, the 4-bit command portion of the data is allowed to pass through the gates 642, 643, 644, and 645 and to be presented to the command outputs 202 of the transceiver 200.

In FIG. 6A, the command outputs are shown connected by resistors 646 to the bases of NPN transistors 647 having emitters and collectors which may be connected in whatever manner is desired to external devices. Typically, the collectors of the transistors 647 are wired to a source of +12 volt potential, and signals are accepted from the transistor emitters which fluctuate from ground to a positive level and which present the 4-bit command word that is contained within the 20-bit message. Alternatively, the transistor emitters may be grounded, and resistors may be connected between the transistor collectors and a positive source of potential so that inverted, larger amplitude command word signals are presented. As another alternative, relay coils may be connected directly between the collectors of the transistors and a positive sourc of potential, and the transistor emitters may be grounded, so that each of the transistors may drive a relay. The relay coils would be by-passed by a diode, by a diode in series with a resistor, by a capacitor in series with a resistor, or by some other equivalent transient suppressing circuit so that the transistors 647 could not be damaged by transients developed within the relay windings. The command word is typically presented for 100 milliseconds.

If the transceiver 200 is used at a central location, it is desirable only to check the first and last frame bit groups of a 20-bit message to see if the frame bits are properly formatted. For this purpose, a gate 648, shown in the lower left-hand corner of FIG. 6A, is provided having inputs connected to the outputs of the gates 635 and 638 which gates check only the frame bit portions of a 20-bit message. The gate 648 is preferably selected to generate an output only if both the front and the rear frame bit portions of the 20-bit data set contain the proper coding. In response to a signal from the gate 648, a computer or other external device may then retrieve 12 bits of message data from the central 12-bit portion of the shift register 208.

The output signal generated by the gate 639 is applied by a diode 649 to an input of the gate 632 where it prevents the absence of further mark and space code bits from clearing the shift register 208 during the data presentation interval. This same signal is also applied by a diode 650 to an input of the gate 627 so as to prevent any further mark and space codes from actuating the flip-flop 622 and causing data to be shifted forward within the shift register 208. The signal also flows into FIG. 6B and is applied to any desired external device as a COMMAND OUTPUTS READY signal which may be used to cause an external device to accept data presented at the command outputs 202.

Operation of the transmitter portion of the transceiver 200 is initiated by the signal which flows from the gate 639. This signal flows through a resistor 651 which appears just to the right of the center of FIG. 6B and charges a timing capacitor 652. The purpose of having the resistor 651 and timing capacitor 652 is to delay the commencement of a transmission for a time to allow external equipment to accept the command outputs 202, to respond to the command outputs, and to present data to the 12-bit data inputs 204. The delay period, of course, is variable and may be adjusted simply by changing the value of the resistor 651 or of the capacitor 652. If an extra long or short delay is required, an external signal may be applied to a DELAY TRANSMIT terminal so as to initiate a transmission at any arbitrary time. When the transceiver 200 is used at a central location, operation of the transmitter may be controlled completely by signals which are applied to the DELAY TRANSMIT terminal, and the resistor and capacitor 651 and 652 would then have no effect upon the system operation.

After the capacitor 652 is sufficiently charged, or after a positive level signal is applied to the DELAY TRANSMIT terminal, a positive signal is developed at an upper input to a gate 654 shown at the bottom of FIG. 6B. The gate 654 is interconnected with a gate 655 shown in the upper portion of FIG. 6D to form a flip-flop, and this positive level signal sets the flip-flop and causes a positive potential to appear at the output of the gate 655. This positive potential is amplified by a unity-gain, common-collector transistor amplifier 656 and is applied to a signal line 657 to initiate operation of the transmitter portions of the transceiver 200.

To relate FIG. 2 to FIG. 6, the transmitter start/stop control in FIG. 2 corresponds to: the gate 639 in FIG. 6A; the resistor 651, capacitor 652, and gate 654 in FIG. 6B; and the gate 655 and the transistor 656 in FIG. 6D. The start delay circuit 231 shown in FIG. 2 corresponds to a monostable multivibrator 658 shown in FIG. 6B and to other elements which have not yet been described.

In order to fully prevent any further action on the part of the data receiver portions of the transceiver 200, the signal on the line 657 is fed into FIGS. 6A and 6C as a disabling signal to prevent any operation on the part of various logic components shown in those figures. In FIG. 6A, the signal on the line 657 enters at the lower right-hand corner of the figure, disables the gate 632 to prevent a premature resetting of the shift register 208, and disables the command output gate 232 by disabling the individual gates 642, 643, 644, and 645 so as to prevent data which is to be transmitted from being interpreted as a new command. In FIG. 6C, the signal on the line 657 is applied through a diode 659 to the output of the sync tone detector 212 so as to lock the flip-flop 622 shown in the upper left-hand corner of FIG. 6D in a set state and so as to enable the gate 623 to pass pulses from the transmit clock 236 shown in the lower left-hand portion of FIG. 6B to the toggle or shift inputs of the flip-flops which comprise the shift register 208. The signal on the line 657 is also applied through a resistor 660 to an input of a gate 627 so as to prevent further occurrences of mark and space pulses from changing the state of the gate 624' which comprises one-half of the flip-flop 622 shown in the upper left-hand corner of FIG. 6D.

In FIG. 6B, the signal on the line 657 is applied to the transmit/receive relay 248 so as to cause this relay 248 to actuate any external device which requires relay actuation before a transmission can begin. The signal 657 is also passed through a resistor 661 shown in the upper right-hand portion of FIG. 6D to an external terminal which is labeled the TRANSMIT PWR terminal to actuate or to supply power to any additional devices which are to be energized at a time when a transmission is to occur.

The signal on the line 657 prepares the transceiver module 200 to generate a tone modulated audio output signal message. The actual message transmission is initiated by the onset of this same signal. The leading edge of the signal flows along the line 657 up into FIG. 6B, through a capacitor 662 shown towards the center of FIG. 6B, and is delivered as a positive going pulse to an input of a monostable multivibrator 658. The monostable multivibrator 658 includes two gates 663 and 664 which are interconnected in the manner of a flip-flop but which include a capacitor 665 and a resistor 666 inserted to give the arrangement a monostable characteristic. In response to the onset of a positive signal upon the line 657, the monostable circuit supplies a positive signal to a signal line 667. This positive signal causes a transistor 668 to become fully conductive and to lock the transmit clock 236. The positive signal upon the line 667 also disables a gate 669 from passing a signal from the flip-flop gate 654 to the tone gate 240. Hence, the output signal 667 generated by the monostable multivibrator 658 locks the transmit clock 236 and prevents any tones from being applied to the transceiver audio output 242.

The positive signal upon the line 667 also passes through the upper left portion of FIG. 6D and the upper right portion of FIG. 6C and is fed through a diode 672 in the center right portion of FIG. 6A to the clear input terminals of the flip-flops which comprise the shift register 208. The flip-flops in the shift register 208 are thus cleared during the period when the monostable multivibrator 668 is generating a positive signal. The signal 667 is also fed to one terminal of a capacitor 673 the other terminal of which is connected to a positive source of potential by a resistor 674. During the period when the signal 667 is positive, the capacitor 673 discharges through the resistor 674 and is left essentially discharged, although some residual charge may remain within the capacitor.

The transmission of data begins when the output signal of the monostable multivibrator 658 which appears on the line 667 goes to ground potential. When this happens, the capacitor 673 applies a ground or low level potential strobe pulse through a resistor 675 to the inputs of the plurality of gates shown at the top of FIGS. 6A and 6B which gates collectively comprise the data input gates 234. The gates 234 then accept data from the 12-bit data inputs 204 and from the 4-bit frame inputs, and the gates 234 load this data into the 20-bit shift register 208. In this manner, the shift register 208 is loaded with a message and is made ready to transmit.

The transistor 668 is rendered nonconductive when the line 667 goes to ground, and the transistor 668 frees the transmit clock 236 and allows the clock 236 to generate the timing signals which control the transmission of data. The ground level potential on the line 667 also enables the gate 669 to pass an output signal from the flip-flop gate 654 to the tone gate 240 so that the gate 240 connects the output of the tone transmitter 238 to the audio output 242 of the transceiver 200.

The transmit clock 236 is a simple bistable multivibrator which is normally disabled by the fact that the signal line 657 is normally at ground potential. When a message transmission is initiated, the signal line 657 goes to a positive level, as has been explained, but the transmit clock 236 is still kept from operating by the transistor 668 which disables the clock 236 until the data for transmission has been loaded into the shift register 208. After the data has been loaded, the transmit clock 236 is allowed to freerun. The clock 236 is simply two NAND gates having their respective inputs and outputs interconnected by simple R-C circuits to form a bistable multivibrator.

The clock 236 immediately begins to generate pulses which are applied directly to the toggle inputs of the flip-flops comprising the shift register 208. These pulses pass through the gate 623 shown in the upper left-hand corner of FIG. 6D. When the transmit clock 236 generates a negative signal, the negative signal is inverted by the gate 623 into a positive signal which is applied thorugh a resistor 677 to the base of a switching transistor 676. The switching transistor 676 becomes fully conductive, shorts out certain resistors within the one transmitter 238, and causes the tone transmitter 238 to generate a 1,000 Hz. synchronizing tone which is supplied to the audio output 242.

When the transmit clock generates a positive signal, the output of the gate 623 in FIG. 6D goes negative and renders the transistor switch 676 nonconductive. A tone is now generated whose frequency is either 800 or 900 cycles, depending upon whether a transistor switch 678 is conductive or nonconductive. The base of the transistor switch 678 is connected by a resistor 679 to the output of the right-most flip-flop within the shift register 208, and hence its conduction or nonconduction is dependent upon whether a "1" or a "0" data bit occupies the right-most position of the shift register 208.

The fluctuating signal which appears at the output of the gate 622 is applied to the toggle or shift inputs of the flip-flops within the shift register 208 to shift the 20 bits of data within the shift register 208 forward one bit position after each cyclic operation of the transmit clock 236. The apparatus just described generates a tone signal in which synchronizing signals of 1,000 Hz. separate successive 800 and 900 Hz. signals representing a 20-bit message.

When the entire contents of the shift register 208 have been transmitted, a space detector gate 246 shown in the lower right-hand corner of FIG. 6B and comprising gates 680, 681, 682, 683, and 684 detects the presence of "0" data bits in the fifteen left-most bit positions of the shift register 208. Each of the gates 680, 681, 682, and 683 has inputs which connect to flip-flops within the register 208. When all of the data has been shifted from the register 208, all of the inputs to the gates 680, 681, 682, and 683 are at ground and all of these gates generate positive output signals which are supplied to the gate 684. When all of these output signals are positive, the gate 684 also generates a positive output signal. This signal is inverted by a gate 685 and is used to discharge the capacitor 652 through a diode 686. This signal is also converted into a pulse by a capacitor 687 and is used to reset the flip-flop that is formed by the interconnected gates 654 and 655 which respectively appear in FIGS. 6B and 6D. Resetting of this flip-flop causes the signal line 657 to go to ground level and thus completely resets transceiver module 200 and prepares it to receive another message signal.

The tone transmitter 238 comprises an operational amplifier 688 having its input and output interconnected by a conventional twin-T resistor-capacitor tuned circuit so as to produce an audio oscillator whose frequency of oscillation may be varied by varying the values of resistance elements within the twin-T feedback circuit. In particular, the magnitude of the resistance at 690 connecting the midpoint of the capacitive side of the twin-T to ground is varied by the transistor switches 676 and 678 as has already been explained so as to set the frequency of the tone transmitter. The tone gate 240 which couples the output of the tone transmitter to the audio output 242 is simply a transistor having its emitter and collector terminals connected respectively to the audio output 242 and the output of the operational amplifier 688. The transistor base is either biased to ground so as to reverse-bias the base-emitter and base-collector junctions and thereby prevent any current from flowing through the transistor 240, or the base is biased to a positive potential through a resistor 692 so as to forward-bias both the base-emitter and base-collector junctions and thereby connect the audio output of the amplifier 688 to the audio output 242 through a resistive network 670 and a coupling capacitor 671.

While there has been described the preferred embodiment of the present invention, it is to be understood that numerous modifications and changes will occur to those who are skilled in the art. It is therefore intended by the appended claims to cover all such modifications and changes as come within the true spirit and scope of the invention.

What is claimed as new and desired to be secured by Letters Patent of the United States is:

1. A data transceiver comprising:

a shift register having a serial data input, a serial data output, a parallel data input, a parallel data output, and a shift input;

tone-signal receiver means responsive to an incoming tone-modulated signal for extracting data from the tone-modulated signal and for loading the data into said shift register, said receiver means comprising mark tone detector means for generating an output when a mark tone is presented by said tone-modulated signal, space tone detector means for generating an output when a space tone is presented by said tone-modulated signal, synchronization tone detector means for generating an output when a synchronizing tone is presented by said tone-modulated signal, a flip-flop having an output and arranged to be placed in a first state by an output of the mark tone detector means and arranged to be placed in a second state by an output of the space tone detector means, means coupling the output of said flip-flop to the serial data input of said shift register, and means for supplying the output of said synchronization tone detector to the shift input of said shift register;

a decoder connecting to selected portions of the parallel data output of said shift register and generating an output signal when said selected portions present a predetermined set of data;

data output gates connecting to other selected portions of the parallel data output of said shift register and actuated by the output signal of said decoder to transfer data out of said shift register;

data input gates connecting to the parallel data inputs of said shift register;

means responsive to said decoder output signal for enabling said data input gates to load data into said shift register; and tone transmitter means for converting the contents of said shift register into a tone signal suitable for transmission, said transmitter means comprising a clock generating first and second signals or signal levels placed into operation in response to said address decoder output signal, tone generator means having an input connecting to said clock and another input connecting to said shift register serial data output for generating: a first tone corresponding to a synchronizing tone when said clock is generating said first signal or signal level; and a second or third tone in dependence upon the data presented by said shift register at said serial data output when said clock is generating said second signal or signal level, and means coupling said clock to the shift input of said shift register for advancing the data within said shift register one data position for each generation of said first and second signals or signal levels.

2. A data transceiver in accordance with claim 1, wherein all of the elements set forth in claim 9 are modularized, and wherein the resultant transceiver is intended to interconnect with other modules, including the following:

an analog-to-digital conversion module including an analog-to-digital converter, including a plurality of analog signal inputs, including a control input suitable for interconnection with said data output gates, also including means for interconnecting said converter to particular ones of said analog signal inputs in response to the presentation by said data output gates of differing combinations of data, and having a digital output suitable for interconnection with said data input gates.

3. A data transceiver in accordance with claim 1, wherein all of the elements set forth in claim 1 are modularized, and wherein the resultant transceiver is intended to interconnect with other modules, including the following:

an accumulator module containing a plurality of counters having outputs, including means for advancing said counters in response to pulse signals, including a control input suitable for interconnection with the data output gates and a data output suitable for interconnection with said data input gates, and including means responsive to data applied to said control input for connecting selected ones of said counter outputs to said data output.

4. A data transceiver in accordance with claim 1, wherein all of the elements set forth in claim 9 are modularized, and wherein the resultant transceiver is intended to interconnect with other modules, including the following:

a multiplexer module including a control input suitable for interconnection with said data output gates, including a plurality of decoded-command signal outputs, and including means for energizing a different one of said decoded-command signal outputs in response to each different input data combination which is applied to said control input.

5. A data transceiver in accordance with claim 1, wherein all of the elements set forth in claim 9 are modularized, and wherein the resultant transceiver is intended to interconnect with other modules, including the following:

a multiplexer module including a plurality of external status data inputs, including gates connecting groups of said external input to a plurality of output data lines suitable for interconnection with said data input gates, and including control means having a control input suitable for interconnection with said data output gates for causing selected sets of said external inputs to be presented to said transceiver for transmission in response to selected data appearing at said control input.

6. A data transceiver in accordance with claim 1 and further including detector means connecting to a plurality of the outputs of said shift register for generating a signal when said register contains no more data for transmission, and means for terminating the operation of said clock in response to the signal from said detector means.

7. A tone transceiver in accordance with claim 1 to which is added a relay having a plurality of contracts, and means coupling said relay to said tone transmitter means for actuating said relay whenever a tone signal is produced.

* * * * *